(12) United States Patent
Kobayashi

(10) Patent No.: US 6,313,758 B1
(45) Date of Patent: *Nov. 6, 2001

(54) AUTOMATIC FOLLOWING TRAVEL SYSTEM

(75) Inventor: Sachio Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,456

(22) Filed: May 30, 2000

(30) Foreign Application Priority Data

May 31, 1999 (JP) .................................................. 11-153106

(51) Int. Cl.$^7$ ........................................................ G08G 1/00
(52) U.S. Cl. ........................ 340/932; 340/436; 340/903; 701/23; 701/29; 701/301; 701/200
(58) Field of Search ........................................ 340/932, 902, 340/903, 904, 436, 479; 180/167, 169; 701/23, 24, 96, 301, 200, 29, 1; 318/587, 480

(56) References Cited

U.S. PATENT DOCUMENTS

| | | | |
|---|---|---|---|
| 5,680,122 | * 10/1997 | Mio | 340/932 |
| 5,934,399 | * 8/1999 | Iiboshi | 180/169 |
| 6,128,559 | * 10/2000 | Saitou | 701/23 |
| 6,169,940 | * 1/2001 | Jitsukata | 701/23 |

* cited by examiner

Primary Examiner—Daniel J. Wu
Assistant Examiner—Anh La
(74) Attorney, Agent, or Firm—Arent Fox Kintner Plotkin & Kahn

(57) ABSTRACT

The processional travel control apparatus of the present invention allows processional travel with a leading vehicle driven by a driver and at least one succeeding vehicle automatically following the leading vehicle. Each of the vehicles comprises: a communicator for communicating with other vehicles; a condition detector for detecting the condition of an object vehicle; an abnormality determining device for determining the occurrence of an abnormality in the object vehicle, based on condition information detected by the condition detector; an abnormality signal transmitter for transmitting an abnormality signal, indicating that the abnormality has occurred in the object vehicle, via the communicator; and an abnormality stop device for stopping the processional travel of at least a part of the vehicles, which includes the vehicle which has transmitted the abnormality signal, when the abnormality signal has been transmitted by one of the vehicles.

3 Claims, 8 Drawing Sheets

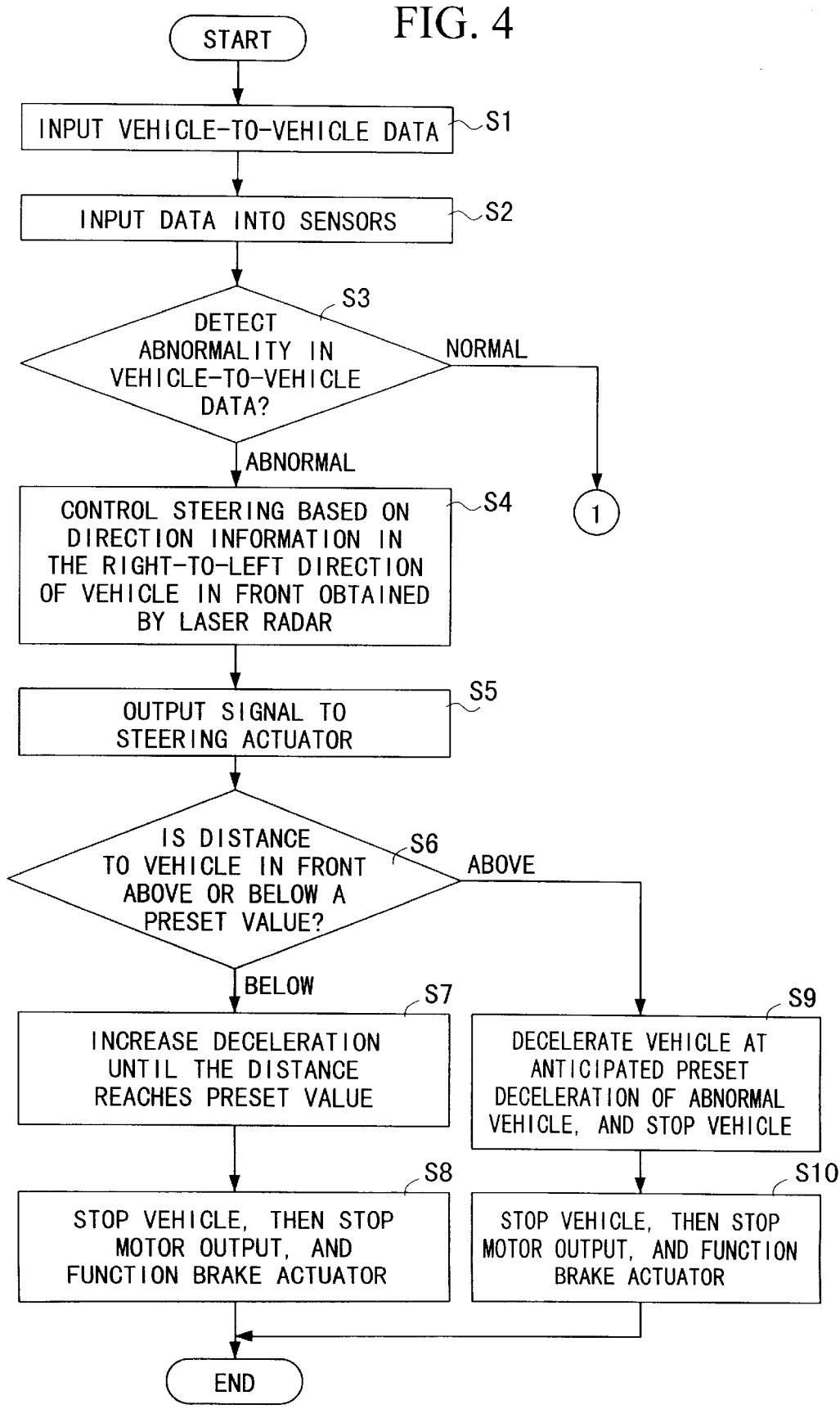

DETERMINATION OF SLIPPAGE

AUTOMATIC FOLLOWING TRAVEL SYSTEM

BACKGROUND OF THE INVENTION

1. Field of the Invention

The present invention relates to an automatic following travel system wherein, among a plurality of queued vehicles, a leading vehicle positioned at the front is operated by an operator, and the following vehicles positioned behind the leading vehicle automatically follow the leading vehicle so as to travel in a procession.

This application is based on Japanese Patent Application No. 11-153106, the contents of which are incorporated herein by reference.

2. Description of the Related Art

As is commonly known, systems have been proposed wherein small electric vehicles are used in common by a plurality of users in a defined region, and thereby, efficient use of the vehicles is achieved, and by means of this, problems such as congestion and insufficient space are relieved, and a savings in resources and energy, as well as an improvement in environmental contamination, are achieved.

In other words, dedicated parking, termed ports, is established at a number of places within a limited region, and users are able to freely borrow vehicles from these ports, and furthermore, after the use of the vehicles, the vehicles may be returned to the ports. By means of this, users are able to employ the vehicles only when they are required. Furthermore, if there are large number of ports, it will not be necessary to search for parking space or to park along the side of the road, and it is thus possible to alleviate congestion.

However, in such a system, as a result of the locations at which the ports are established or the like, there are concerns that vehicles may become concentrated at some ports, while at other ports, vehicles will become insufficiently available.

Techniques have been proposed for moving a plurality of vehicles efficiently between ports so as to easily remedy this imbalance of vehicles existing between ports (for example, in Japanese Patent Application, First Publication, No. Hei 5-170008). In this technique, among a plurality of queued vehicles, only the leading vehicle, which is positioned at the front, is manually operated by an operator, and the operation of the following vehicles is automatically controlled based on data relating to the amount of driving operation of the leading vehicle which is transmitted from the leading vehicle. By means of this, driving is controlled so that the following vehicles trace the same track as the leading vehicle, and as a result, a state is realized in which a series of vehicles travel in such a manner as to form a procession with the leading vehicle in the front (processional travel). At this time, because the operation of the following vehicles is automatically controlled, unmanned operation is possible, and it is possible to reduce the number of humans involved.

However, because following vehicles are driven in an unmanned state while traveling in a procession, emergency measures cannot be immediately taken if an accident occurs in the following vehicles.

BRIEF SUMMARY OF THE INVENTION

It is therefore an object of the present invention to provide a processional travel control apparatus which can take emergency measures if an abnormality occurs in one of the vehicles, in particular, in a succeeding vehicle.

In a first aspect of the invention, the processional travel control apparatus allows processional travel with a leading vehicle driven by a driver and at least one succeeding vehicle automatically following the leading vehicle. Each of the vehicles comprises: a communicator (vehicle-to-vehicle radio communicator 30, and vehicle-to-vehicle antenna 10) for communicating with other vehicles; a condition detector (laser radar 7, acceleration sensor 22, and yaw rate sensor 23) for detecting the condition of an object vehicle; an abnormality determining device (40) for determining the occurrence of an abnormality in the object vehicle, based on condition information detected by the condition detector; an abnormality signal transmitter (42) for transmitting an abnormality signal, indicating that the abnormality has occurred in the object vehicle, via the communicator; and an abnormality stop device (44) for stopping the processional travel of at least a part of the vehicles, which includes the vehicle which has transmitted the abnormality signal, when the abnormality signal has been transmitted from one of the vehicles.

When an abnormality has occurred in one of the vehicles traveling in a procession, the processional travel of the vehicles which include the abnormal vehicle is stopped. Therefore, appropriate emergency measures can be taken.

In a second aspect of the invention, when the abnormality signal has been transmitted from one of the vehicles, the processional travel of the vehicles in front of the vehicle which has transmitted the abnormality signal continues, and the vehicle which has transmitted the abnormality signal and the vehicles behind that vehicle stop their travel.

The vehicles behind the abnormal vehicle stop as the preceding vehicle (which is the abnormal vehicle) stops, and maintains their stopped conditions. Therefore, there is no further problem even if an abnormality has occurred in the vehicles.

The vehicles in front of the abnormal vehicle keep following the leading vehicle, and continue the processional travel.

In a third aspect of the invention, each of the vehicles comprises: a recognition device (vehicle number storage device 31) for recognizing its sequence number from the head of the procession when starting the processional travel, the abnormality signal including the vehicle number of the vehicle which has transmitted the abnormality signal; and a processional travel stop/continuation determining device (steps 15, 18, and 19) for determining whether the object vehicle stops or continues, based on a comparison of the number of the object vehicle with the number of the vehicle which has transmitted the abnormality signal.

According to this structure, the vehicles behind the abnormal vehicle can immediately and appropriately make a determination as to whether to stop or continue traveling.

BRIEF DESCRIPTION OF THE DRAWINGS

FIG. 3A shows normal processional travel, and FIG. 3B shows a situation in which an abnormality has occurred in one of the vehicles.

FIG. 4 is a flowchart showing the control process of the automatic following travel system of the invention.

DETAILED DESCRIPTION OF THE INVENTION

Embodiments of the invention will be explained based on the figures.

Figure 1:
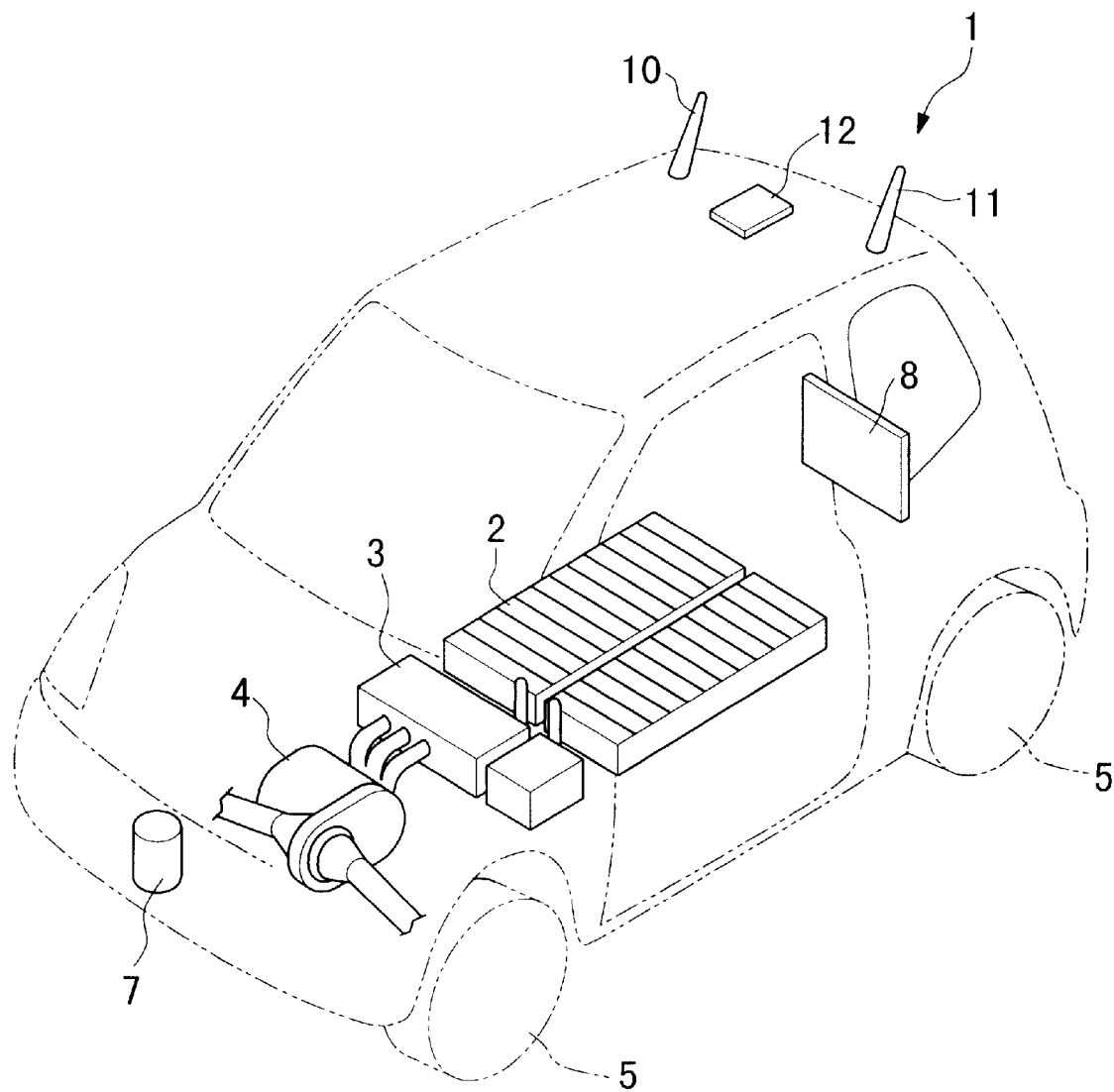
FIG. 1 is a perspective view of an electric vehicle of the embodiment of the automatic following travel system of the invention.

FIG. 1 schematically shows the structure of an electric vehicle used in the automatic following travel system of the embodiment of the present invention.

As shown in this figure, the electric vehicle 1 is constructed to be capable of manned and unmanned driving. Electric energy from a battery 2 is supplied to a motor 4 controlled by a driving force control ECU 3, and the motor 4 rotates wheels 5 to drive the vehicle.

The electric vehicle 1 is fitted with a laser radar 7 in the center of the front bumper capable of wide angle scanning, and a reflector 8 in the center of the rear bumper, which is a plate with a mirror finish for reflecting a radar wave emitted by a laser radar 7 of a succeeding vehicle.

When the electric vehicle 1 travels, the succeeding vehicle can pick up the location of the reflector 8 of the preceding vehicle in real time using the laser radar 7 of the succeeding vehicle, and can therefore detect the location of the preceding vehicle (the distance from the preceding vehicle) and its direction in real time.

Installed in the roof of the electric vehicle 1 are; a vehicle to vehicle antenna 10 for radio communication between electric vehicles 1 (vehicle to vehicle communication), a road to vehicle antenna 11 for radio communication for radio communication with communication devices or a center (both of which are not shown), and a GPS/DGPS antenna 12 for receiving radio waves from GPS satellites and DGPS stations.

Figure 3A:
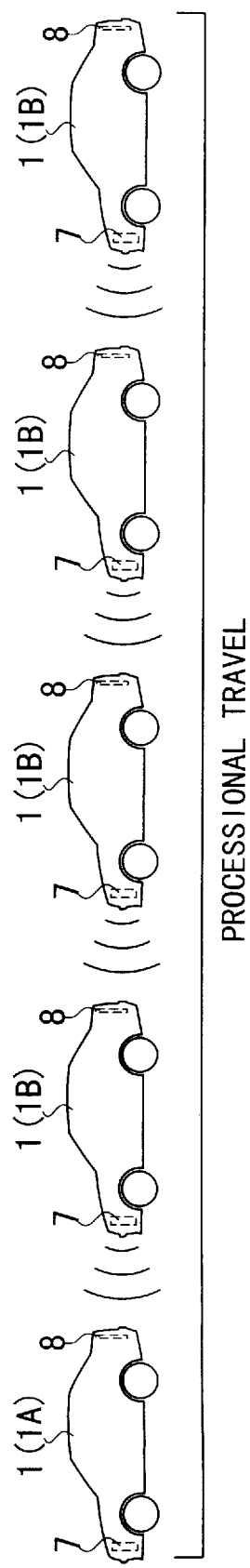
FIGS. 3A and 3B show the conditions of the processional travel carried out by the automatic following travel system of the invention.
Figure 3B:
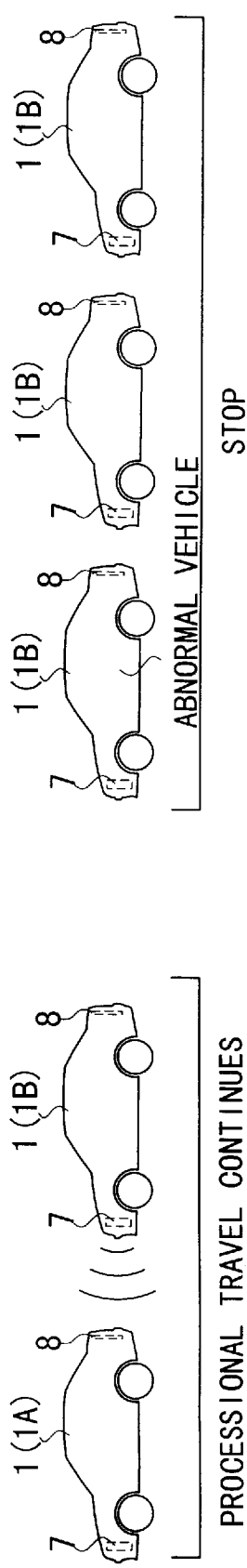

FIG. 3 shows the situation in which the electric vehicles 1 are traveling. Among electric vehicles 1 traveling in a procession, an electric vehicle 1 that is driven by a driver and travels at the head is called a leading vehicle 1A, electric vehicles 1 following the leading vehicle 1A are called succeeding vehicles 1B. There may be one or more succeeding vehicles. In this embodiment, the leading vehicle 1A, and the succeeding vehicles 1B have the same specification and are the same type of electric vehicle. By means of a switch not shown, the electric vehicle 1 can be switched between the manually driven manned leading vehicle 1A and the automatically operated unmanned succeeding vehicles 1B.

Figure 2:
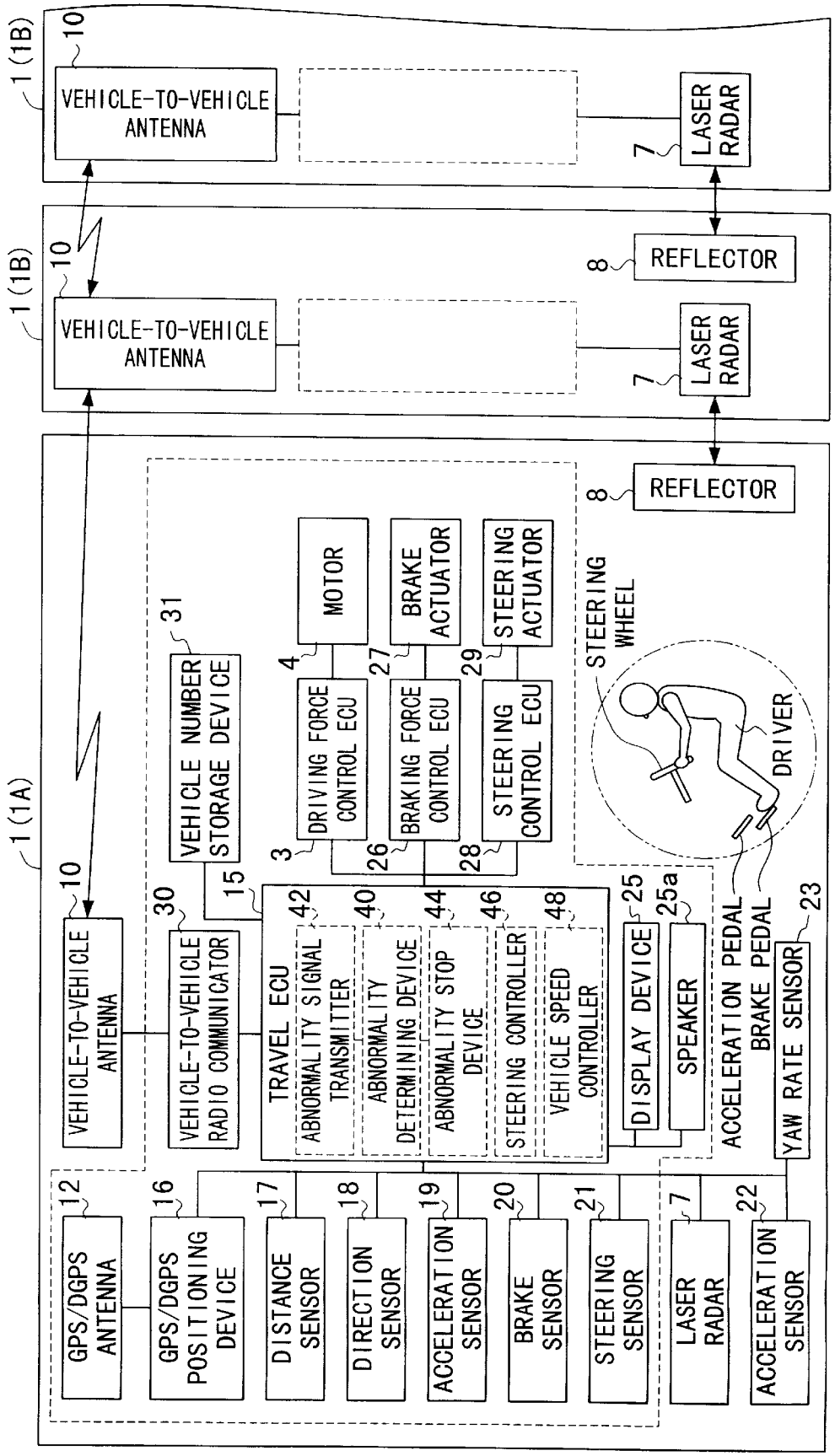
FIG. 2 is a block diagram showing the control structure of the electric vehicle of the automatic following travel system of the invention.

FIG. 2 shows the control blocks indicating structural elements for conducting processional travel of the electric vehicles 1. As shown in this figure, the electric vehicle 1 has a travel ECU 15 which is a complete control processing device. The travel ECU 15 is connected to a GPS/DGPS positioning device 16 for measuring the current location of the vehicle (latitude and longitude), a distance sensor 17 for detecting the traveled distance to calculate the driving speed and the like, a direction sensor 18 for detecting the direction of the vehicle, an acceleration sensor 19 for detecting control torque, which is the degree of operation of a motor 4 corresponding to the opening of the accelerator, a brake sensor 20 for detecting the brake oil pressure, which is the degree of operation of the brake, a steering sensor 21 for detecting the steering angle, which is the degree of operation of the steering, the aforementioned laser radar 7, an acceleration sensor 22 for detecting acceleration of the electric vehicle 1, and a yaw rate sensor 23 for detecting the angular velocity in the transverse direction of the electric vehicle 1.

Because the accuracy of the GPS/DGPS positioning device 16 in detecting a position is low, e.g., approximately 1 meter, the GPS/DGPS positioning device 16 is not used for the driving control (feed-back control, and feed forward control) in the processional travel. The GPS/DGPS positioning device 16 allows a center for central administration of the electric vehicles 1 to confirm the location of the procession within the traveling area, and allows a display device 25 of a navigation device with an audio guidance speaker 25a to indicate the location of an object vehicle on a map.

Depending on the controlled torque detected by the acceleration sensor 19, the travel ECU 15 controls the rotation of the motor 4 using the driving force control ECU 3. Depending on the brake oil pressure detected by the brake sensor 20, the travel ECU 15 control s the braking force of a brake actuator 27 using a braking force control ECU 26. Depending on the steering angle detected by the steering sensor 21, the travel ECU 15 controls a steering actuator 29 using a steering control ECU 28.

The automatic following travel shown in FIG 3 is conducted as follows. A present location detector, which is incorporated in the travel ECU 15 of the leading vehicle 1A, detects the location of the object vehicle (e.g., X- and Y-coordinates) and the direction (azimuth) θ of the object vehicle, based on the output from the distance sensor 17 and the direction sensor 18, at a predetermined interval (10 msec), and writes the detected data as track data in a storage device which includes a ring buffer.

A degree-of-operation detector, which is incorporated in the travel ECU 15 of the leading vehicle 1A, detects the degrees of operation output from the acceleration sensor 19, the brake sensor 20, and the steering sensor 21, and writes the degrees of operation in the storage device, pairing them with the track data (the vehicle location (X, Y) and the direction θ).

The track data (the object vehicle location (X, Y), and the direction θ), which was detected by the leading vehicle 1A, and the degrees of operation (the values detected by the acceleration sensor 19, the brake sensor 20, and the steering sensor 21) are transmitted via the vehicle-to-vehicle radio communication device 30 and the vehicle-to-vehicle antenna 10 to the travel ECUs 15 of the respective succeeding vehicles 1B.

The travel conditions of the succeeding vehicles 1B are reported via the vehicle-to-vehicle antenna 10 and the vehicle-to-vehicle radio communication device 30 to the travel ECU 15 of the leading vehicle 1A. Depending on the following travel condition confirmed by the travel ECU 15 of the leading vehicle 1A, the display device 25 and the speaker 25a, which function as a display and warning device, are driven, and the driving force control ECU 3, the motor 4, the braking force control ECU 26, and the brake actuator 27, which are a deceleration device or a stop device, are driven.

The succeeding vehicles 1B receive the track information of the preceding vehicles, the degrees of operation of the leading vehicle 1A, and the difference between the succeeding vehicles and the preceding vehicles. In this embodiment, the preceding vehicle means the vehicle just in front of the object vehicle. That is, the preceding vehicle of the second succeeding vehicle 1B is the leading vehicle 1A, and the preceding vehicle of the third succeeding vehicle 1B is the second succeeding vehicle 1B.

The succeeding vehicle 1B performs the automatic following travel which combines feed forward control and feed back control. In the travel ECU 15 of the succeeding vehicle 1B, the degree of operation, which has been transmitted from the leading vehicle 1A, is extracted by an degree-of-operation extractor, and is used for the feed forward control.

A target position/direction calculator, which is incorporated in the travel ECU 15 of the succeeding vehicle 1B, computes the object position and direction in the track information from the leading vehicle 1A which is the target of the object vehicle, based on the vehicle number of the object vehicle (for example, the vehicle number of the leading vehicle is 1, the vehicle number of the first succeeding vehicle 1B is 2, the vehicle number of the second succeeding vehicle 1B is 3, etc.) which has been input to a vehicle number storage device 31 before the beginning of the processional travel and on the traveled distance output from the distance sensor 17, and uses the target position and direction for the feed back control.

A present location detector which is incorporated in the travel ECU 15 detects the object vehicle position (X, Y) and the object vehicle direction θ, based on the outputs from the distance sensor 17 and the direction sensor 18 of the object vehicle, at a fixed interval (10 msec.).

Further, the object vehicle obtains the distance and direction to the preceding vehicle, based on the output from the laser radar 7, and corrects its present location and direction, based on the calculated values of the distance and direction to the preceding vehicle, the object vehicle location and direction θ calculated by the present location detector, and the track data and the coordinate difference obtained by the vehicle-to-vehicle radio communicator.

Based on the corrected present location and direction of the object vehicle and on the degrees of operation of the leading vehicle 1A extracted by the degree-of-operation extractor, the amount of feed forward control is calculated. On the other hand, based on the corrected present Location and direction of the object vehicle and on the target position and direction output from the target position/direction calculator, the amount of feed back control is calculated.

The obtained amounts of the feed forward control and the feed back control are added together. The amount of acceleration resulting from the addition is supplied via the driving force ECU 3 to the motor 4, the amount of brake control resulting from the addition is supplied via the braking force control ECU 26 to the brake actuator 27, and the amount of steering control resulting from the addition is supplied via the steering control ECU 28 to the steering actuator 29.

As described above, the automatic following travel of the succeeding vehicles is performed.

The position and direction of the object vehicle, which has been detected by the present location detector, and the difference in coordinates of the object vehicle with respect to the preceding vehicle, which has been obtained from the measured value of the laser radar, are transmitted to the succeeding vehicle 1B behind the object vehicle 1B via the vehicle-to-vehicle radio communicator 30, etc.

The travel ECU 15 of the electric vehicle 1 includes an abnormality determining device for determining, based on condition information detected by a condition detector, the occurrence of an abnormality in the object vehicle. Further, the travel ECU 15 of the electric vehicle 1 includes an abnormality signal transmitter 42 for transmitting an abnormality signal, indicating that an abnormality has occurred in the object vehicle, to the other vehicles, using a communicator which comprises the vehicle-to-vehicle radio communicator 30 and the vehicle-to-vehicle antenna 10. The travel ECU 15 of the electric vehicle 1 further includes an abnormality stop device 44 for stopping the object vehicle when the abnormality determining device 40 detects the occurrence of an abnormality in the object vehicle, or when the object vehicle is positioned behind the vehicle in which the abnormality has occurred.

The abnormality determining device 40 determines the occurrence of an abnormality in the object vehicle, based on the values detected by the acceleration sensor 22, the yaw rate sensor 23, the laser radar 7, etc. This device is schematically shown in FIGS. 6 to 10.

Figure 6:
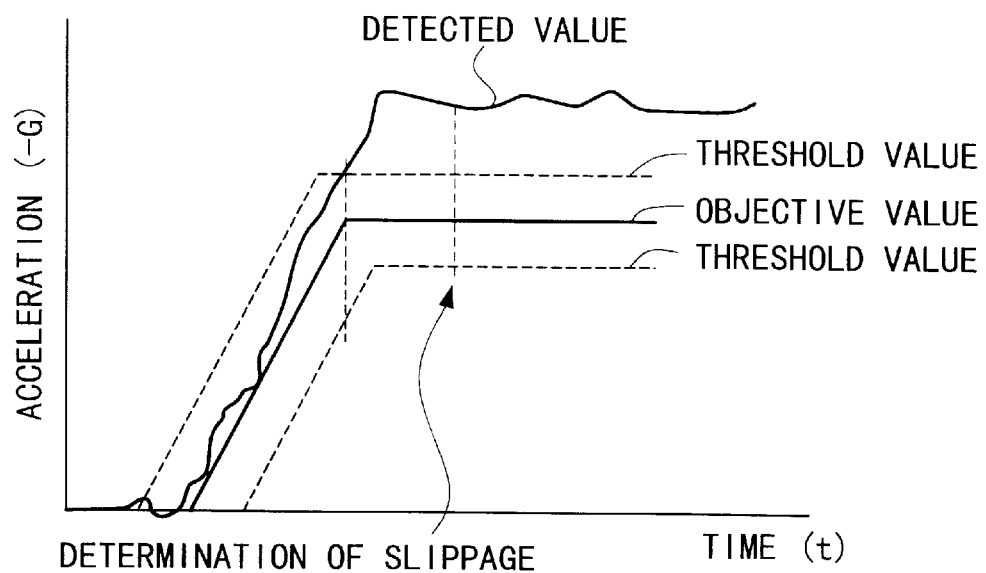
FIG. 6 is a diagram showing the function of the abnormality determining device of the automatic following travel system of the invention.

FIG. 6 shows an example for judging the abnormality, based on the value detected by the acceleration sensor 22 when the vehicle decelerates. When the vehicle decelerates, an objective minus acceleration has been preset beforehand, and threshold values above and below it (at its plus and minus sides) are preset. When the detected value reaches outside this range (exceeds the threshold value) and when the value stays outside the range for more than a predetermined period of time, the device determines that the abnormality has occurred in the object vehicle.

Figure 7:
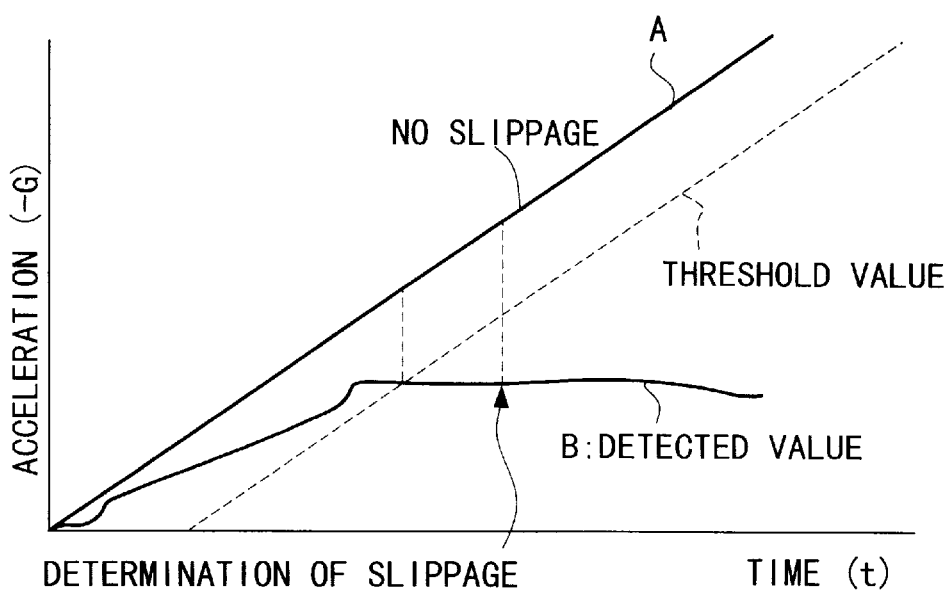
FIG. 7 is a diagram showing the function of the abnormality determining device of the automatic following travel system of the invention.

FIG. 7 shows an example for determining the occurrence of an abnormality in the object vehicle, based on the comparison of the value, detected by the acceleration sensor 22 when the vehicle is decelerating, with a calculated acceleration value which is computed by dividing the vehicle speed, calculated from the rotation speed of the wheels, by time. In this figure, A indicates the calculated acceleration value, and B indicates the value actually detected by the acceleration sensor 22. Around the calculated acceleration value, a fixed threshold value is preset. When the value detected by the acceleration sensor 22 exceeds this threshold value for a predetermined period of time, it is judged that an abnormality has occurred in the vehicle, for example, slippage has occurred between the ground and the wheels.

Figure 8:
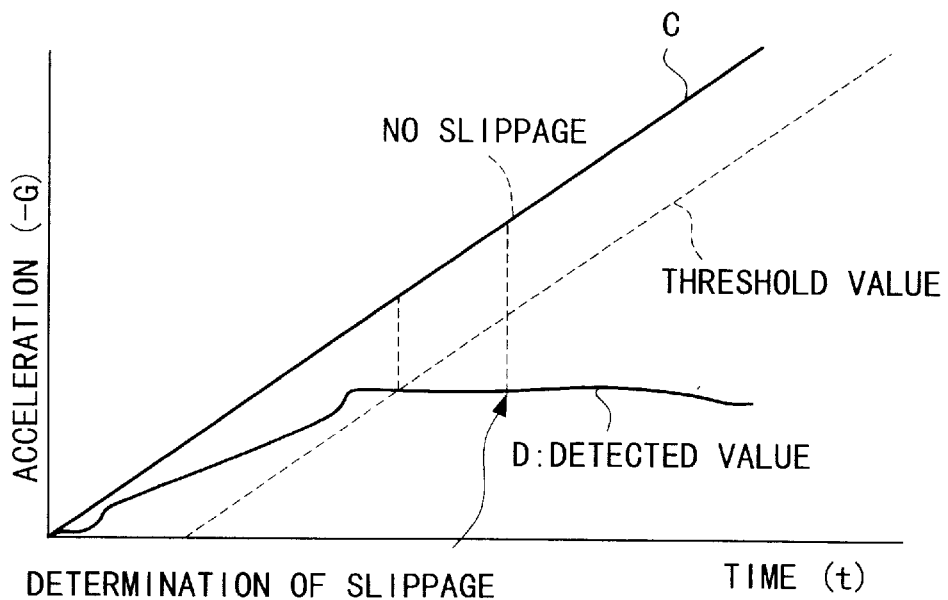
FIG. 8 is a diagram showing the function of the abnormality determining device of the automatic following travel system of the invention.
Figure 9:
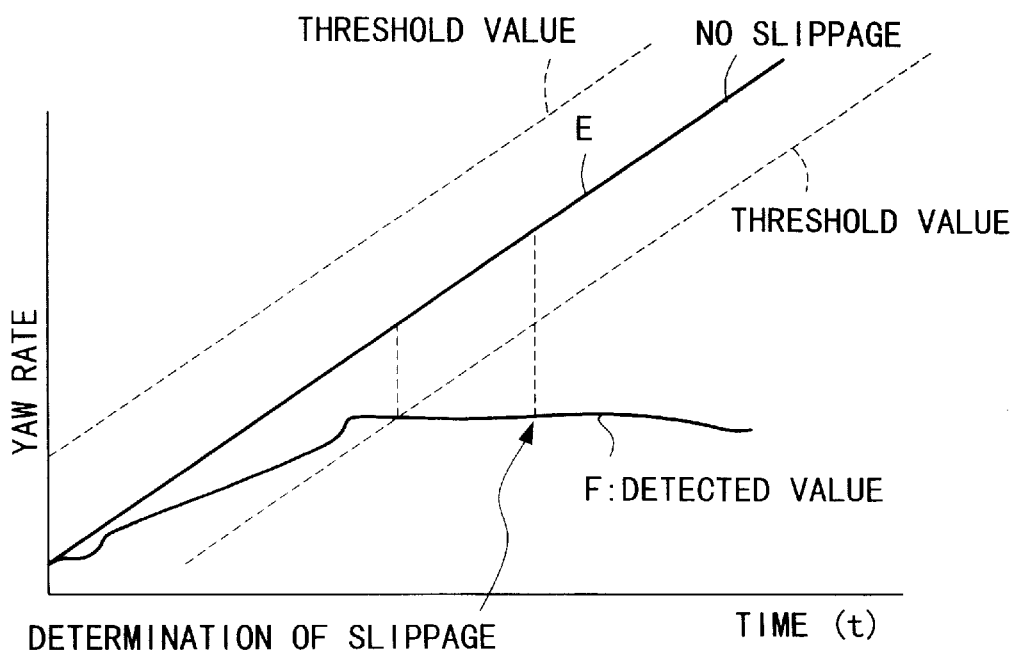
FIG. 9 is a diagram showing the function of the abnormality d determining device of the automatic following travel system of the invention.

FIG. 7 shows an example when the vehicle decelerates, while FIG. 8 shows an example when the vehicle accelerates. That is, FIG. 8 shows an example for determining the occurrence of an abnormality in the object vehicle, based on the comparison of the value, detected by the acceleration sensor 22, with a wheel speed acceleration value which is computed by dividing the vehicle speed, calculated from the rotation speed of the wheels, by time. In FIG. 8, C indicates the wheel speed acceleration value, and D indicates the value actually detected by the acceleration sensor 22. Around the calculated acceleration value, a fixed threshold value is preset. When the value detected by the acceleration sensor 22 exceeds this threshold value for a predetermined period of time, it is judged that an abnormality has occurred in the vehicle, for example, slippage has occurred between the ground and the wheels.

FIG. 8 shows an example for determining the occurrence of an abnormality in the accelerating object vehicle, based on the comparison of the value detected by the yaw rate sensor 23 with the value which is calculated from the steering angle obtained by the steering sensor and from the vehicle speed. In this figure, E indicates the calculated value, and F indicates the value actually detected by the direction sensor 18. The calculated value is obtained from:

(steering angle×∇speed×a)/∇time.

Above and below the calculated value (on the plus and minus sides), threshold values are preset. When the value detected by the yaw rate sensor 23 exceeds this threshold value for a predetermined period of time, it is judged that an abnormality has occurred in the vehicle, for example, slippage has occurred between the ground and the right and left wheels.

Figure 10:
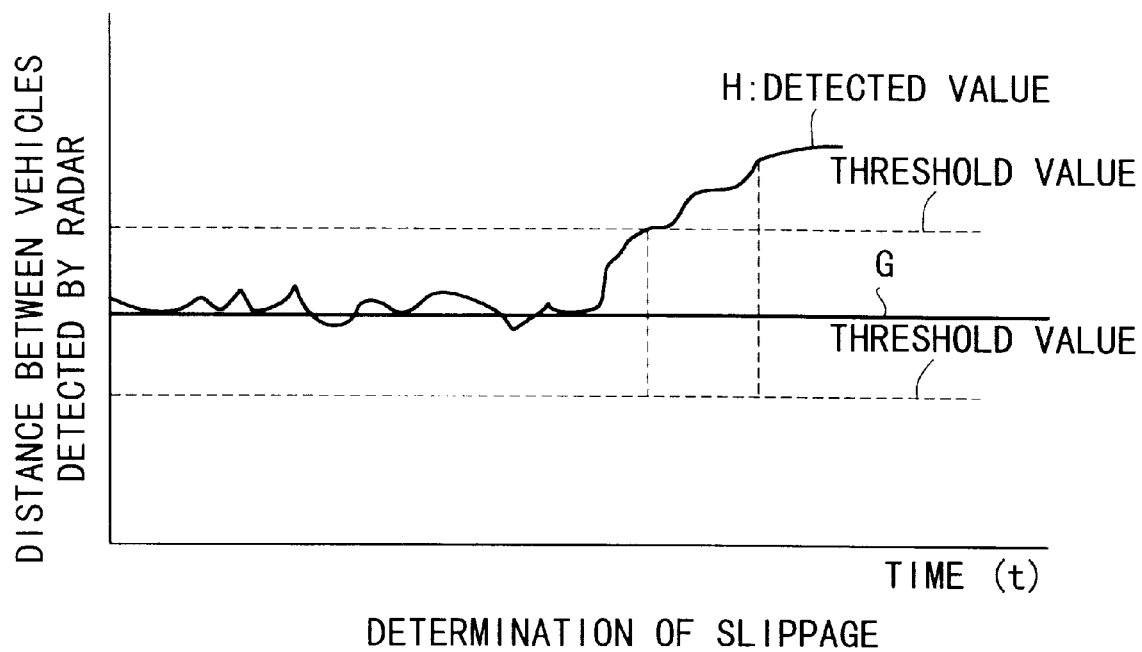
FIG. 10 is a diagram showing the function of the abnormality determining device of the automatic following travel system of the invention.

FIG. 10 shows an example for determining that an object vehicle is abnormal, based on the distance between the object vehicle and the preceding vehicle measured by laser radar 7. An objective distance (indicated by G) between the object vehicle and the preceding vehicle is preset, and above and below the distance (in the minus and plus sides) threshold values are preset. When a value H detected by the laser radar 7 exceeds this range (exceeds the threshold values) and remains for a period of time longer than a preset time, it is judged that an abnormality has occurred in the vehicle.

When it is determined the occurrence of an abnormality in the object vehicle as described above, the abnormality signal transmitter 42 transmits the abnormality signal, indicating the occurrence of an abnormality in the object vehicle, to the other vehicles via the communicator which comprises the vehicle-to-vehicle radio communicator 30 and the vehicle-to-vehicle antenna 10.

On reception of the abnormality signal from the other vehicle, the abnormality stop device 44 includes a processional stop/continuing determining device (steps 15, 18, and 19 described later) for determining whether the object vehicle stops or continues traveling, by comparing the object vehicle number with the number of the vehicle which transmitted the abnormality signal.

Further, the travel ECU 15 comprises a steering controller 46 for switching the steering control to laser radar following when the communicator such as the vehicle-to-vehicle radio communicator 30 becomes abnormal, and a vehicle speed controller 48 for switching the vehicle speed control to laser radar following.

The steering controller 46 performs the steering control, based on the direction information regarding the right-left direction of the preceding vehicle obtained by the laser radar 7, and outputs a signal via the steering control ECU 28 to the steering actuator 29 so as to drive the object vehicle in the same direction as the preceding vehicle.

The vehicle speed controller 48 performs the vehicle speed control, based on the distance information regarding the front-rear direction of the preceding vehicle obtained by the laser radar 7, and outputs a signal via the driving force control ECU 3 and the braking force control ECU 26 to the motor 4 and the brake actuator 27.

Figure 5:
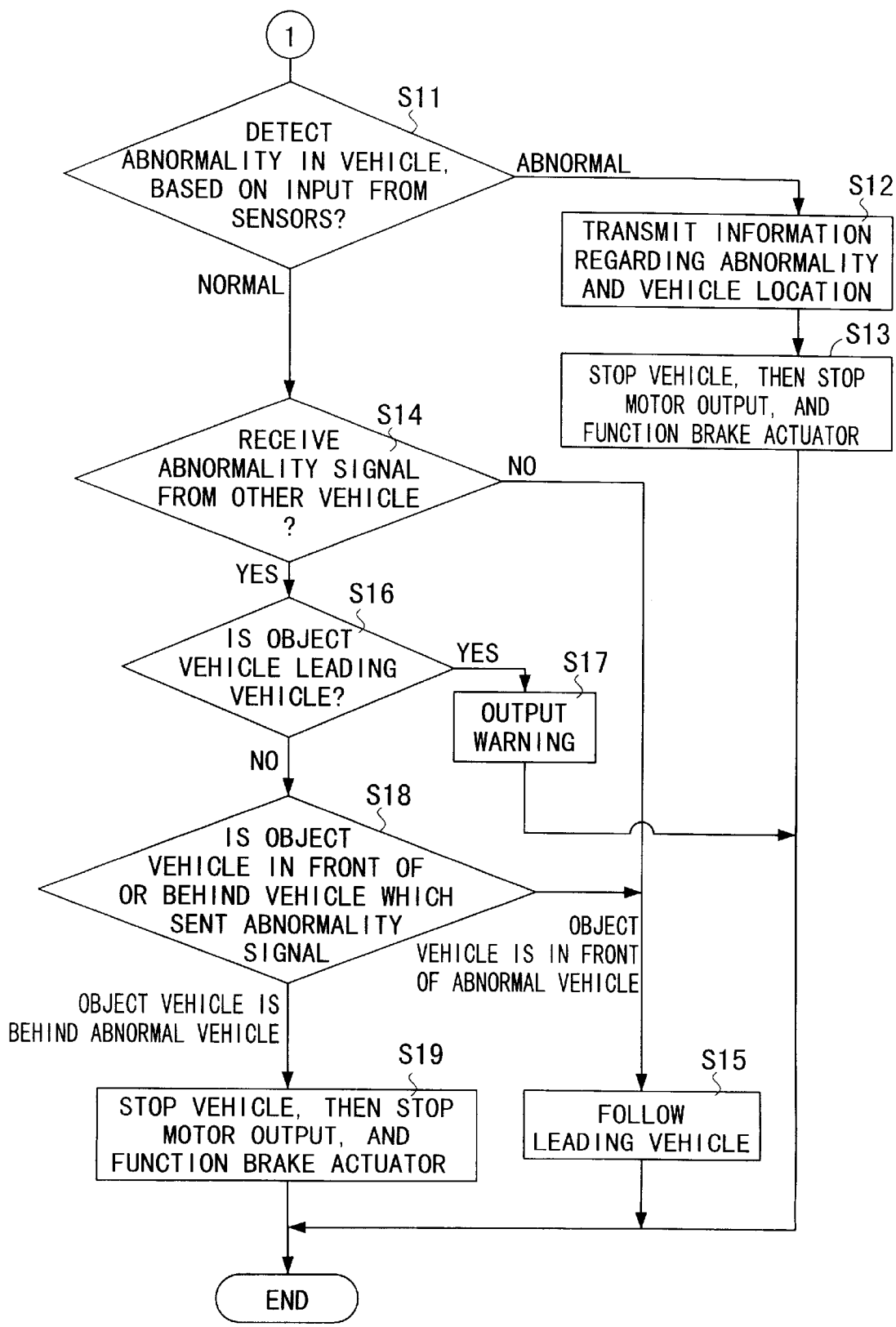
FIG. 5 a flowchart showing the control process of the automatic following travel system of the invention.

The operation of the automatic following travel system will be explained with reference to FIGS. 4 and 5.

Before starting processional travel, the procession number as an ID is determined, and is transmitted via the vehicle-to-vehicle radio communicator 30 and the vehicle-to-vehicle antenna 10 to the respective succeeding vehicles 1B. The respective succeeding vehicle 1B store the procession number in the vehicle number storage device 31.

The vehicle-to-vehicle data is input to the travel ECU 15 (step 1). The vehicle-to-vehicle data are the track data detected by the leading vehicle 1A (the object vehicle location (X, Y) and direction θ, the degrees of operation (the values detected by the acceleration sensor 19, the brake sensor 20, and the steering sensor 21), and the difference in coordinates transmitted from the succeeding vehicles 1B.

The data detected by the sensors 17, 18, 7, 22, and 23 is input to the travel ECU 15 (step 2). The data input from the sensors are the traveled distance, the direction, the distance and direction to the preceding vehicle, the acceleration, and the yaw rate.

Next, it is determined whether the vehicle-to-vehicle communication has become abnormal or not. Specifically, this determination is made based on whether the data obtained by the vehicle-to-vehicle communication is normally input to the travel ECU 15 or not (step 3).

When it is abnormal, the steering controller 46 switches steering control to laser radar following, and the vehicle speed controller 48 switches the vehicle speed control to laser radar following.

That is, the steering controller 46 performs the steering control, based on the direction information regarding the right-left direction of the preceding vehicle obtained by the laser radar 7 (step 4), and outputs a signal via the steering control ECU 28 to the steering actuator 29 so as to drive the object vehicle in the same direction as the preceding vehicle (step 5).

Thus, the vehicle does not trace the leading vehicle, but traces the preceding vehicle just in front of that vehicle, preventing interruption in the automatic following travel.

Next, the vehicle speed controller 48 is activated. It is determined whether the distance between the preceding vehicle and the object vehicle is above the preset value or not (step 6). When it is below the preset value, the deceleration is increased until the distance becomes the preset value. When the distance reaches the preset value, the deceleration at the preset deceleration described below is continued until the vehicle stops (step 7). That is, based on the signal output from the braking force control ECU 26, the brake actuator 27 acts strongly so that the distance to the preceding vehicle is increased, and the vehicle is then decelerated at a standard deceleration for an abnormal vehicle until it stops. After the vehicle has stopped, the vehicle stop control is activated to stop the output from the motor 4 by the driving force control ECU 3, and to engage the brake actuator 27 by the braking force control ECU 26 (step 8).

On the other hand, when the distance between the preceding vehicle and the object vehicle is equal to or above the preset value, the vehicle is decelerated at the an anticipated deceleration for an abnormal vehicle until it stops (step 9). After the vehicle has stopped, the vehicle stop control is activated to stop the output from the motor 4 and to engage the brake actuator 27 (step 10).

When in step 3 the vehicle-to-vehicle communication is normal, the flow proceeds to step 11.

In step 11, the abnormality determining device 40 determines the occurrence of an abnormality in the object vehicle, based on the inputs to the sensors (the laser radar 7, the acceleration sensor 22, the yaw rate sensor 23, etc.).

When an abnormality has occurred, the abnormality signal transmitter 42 transmits the vehicle abnormality information and the vehicle location information via the vehicle-to-vehicle radio communicator 30 and so on to the other vehicles in the procession. The vehicle abnormality information includes deceleration slippage, acceleration slippage, side slippage, abnormal distance detected by radar, or the like. The vehicle location information includes the vehicle number indicating the preset sequence number of the object vehicle from the head of the procession, and the position coordinates (X, Y).

As described above, after the transmission of the vehicle abnormality information, the abnormality stop device 44 decelerates the object vehicle at an anticipated deceleration of the abnormal vehicle, which has been preset, until the object vehicle stops. After the vehicle has stopped, the vehicle stop control is activated to stop the output from the motor 4, and to engage the brake actuator 27 (step 13).

When in step 11 the object vehicle is normal, it is determined whether the vehicle received the vehicle-to-vehicle abnormality signal from the other vehicles in the procession (step 14).

When receiving no signal, the flow proceeds to step 15, and the processional travel in which the vehicle follows the leading vehicle continues.

When receiving the vehicle-to-vehicle abnormality signal from the other vehicles in the procession, it is determined whether the object vehicle is the leading vehicle or not (step 16). When it is the leading vehicle, the warning is output to inform the driver in the leading vehicle of the occurrence of an abnormality in another vehicle (step 17).

When the object vehicle is not the leading vehicle, it is determined whether the object vehicle is in front of or behind the vehicle which has transmitted the abnormality signal (step 18).

This determination can be made, based on the vehicle number, or on the actual position coordinates. The vehicle in which the abnormality has occurred transmits the vehicle location information as well as the vehicle abnormality information. When the vehicle location information includes the vehicle number, it is determined whether the vehicle number of the object vehicle is above or below the vehicle number of the vehicle which has transmitted the abnormality signal. When the vehicle location information includes the position coordinates, it is determined, based on the coordinates, whether the object vehicle is in front of or behind the vehicle which has transmitted the abnormality signal.

When the object vehicle is behind the vehicle which has transmitted the abnormality signal, the object vehicle decelerates and stops. After the vehicle has stopped, the vehicle stop control is activated to stop the output from the motor 4, and to engage the brake actuator 27 (step 19). The vehicle which has transmitted the abnormality signal decelerates at the preset deceleration and stops, as described in step 13. The vehicle behind that vehicle decelerates and stops, while maintaining the distance to the preceding vehicle and tracing the track of the leading vehicle 1A. After the vehicle has stopped, the vehicle stop control is activated to stop the output from the motor 4, and to engage the brake actuator 27 to maintain the stopped condition of the vehicle.

When the object vehicle is in front of the vehicle which has transmitted the abnormality signal, or when receiving no abnormality signal, the flow proceeds to step 15, and the object vehicle continues following the leading vehicle.

This invention may be embodied in other forms or carried out in other ways without departing from the spirit thereof.

For example, although in the above embodiment the abnormality determining device detects deceleration slippage, acceleration slippage, or an abnormality in the distance detected by radar, the invention is not limited to this, and it may detect an abnormal temperature of lubrication oil, decrease in the battery remaining charge, or the like.

What is claimed is:

1. A processional travel control apparatus that allows processional travel with a leading vehicle driven by a driver and at least one succeeding vehicle automatically following the leading vehicle, wherein each of the vehicles comprises:

a communicator for communicating with other vehicles;

a condition detector for detecting the condition of an object vehicle;

an abnormality determining device for determining the occurrence of an abnormality in the object vehicle, based on condition information detected by the condition detector;

an abnormality signal transmitter for transmitting an abnormality signal, indicating the occurrence of an abnormality in the object vehicle, via the communicator; and an abnormality stop device for stopping the processional travel of at least a part of the vehicles, which includes the vehicle which has transmitted the abnormality signal, when the abnormality signal has been transmitted by one of the vehicles.

2. A processional travel control apparatus according to claim 1, wherein, when the abnormality signal has been transmitted by one of the vehicles, the processional travel of the vehicles in front of the vehicle which has transmitted the abnormality signal continues, and the vehicle which has transmitted the abnormality signal and the vehicles behind that vehicle stop their travel.

3. A processional travel control apparatus according to claim 2, wherein each of the vehicles comprises:

a recognition device for recognizing its sequence number from the head of the procession when starting the processional travel, the abnormality signal including the vehicle number of the vehicle which has transmitted the abnormality signal; and a processional travel stop/continuation determining device for determining the stop or continuation of the object vehicle, based on the comparison of the number of the object vehicle with the number of the vehicle which has transmitted the abnormality signal.

* * * * *